R. S. SANBORN.

Pipe-Cutters.

No. 134,007. Patented Dec. 17, 1872.

Witnesses.
F. W. Howard
L. H. Trook

Inventor.
R. S. Sanborn
By his Attorney
Chas. F. Stansbury

AM. PHOTO-LITHOGRAPHIC CO. N.Y. (OSBORNE'S PROCESS.)

UNITED STATES PATENT OFFICE.

RUFUS S. SANBORN, OF ROCKFORD, ILLINOIS.

IMPROVEMENT IN PIPE-CUTTERS.

Specification forming part of Letters Patent No. 134,007, dated December 17, 1872.

*To all whom it may concern:*

Be it known that I, RUFUS S. SANBORN, of Rockford, in the county of Winnebago and State of Illinois, have invented a Rotating Gas-Pipe Cutter; and I do hereby declare the following to be a full and correct description of the same, reference being had to the accompanying drawing, in which—

Figure 1:
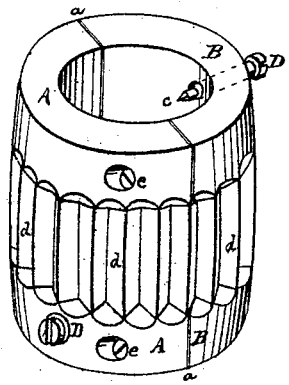
Figure 2:
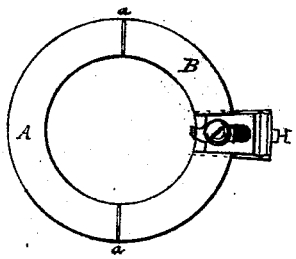
Figure 3:
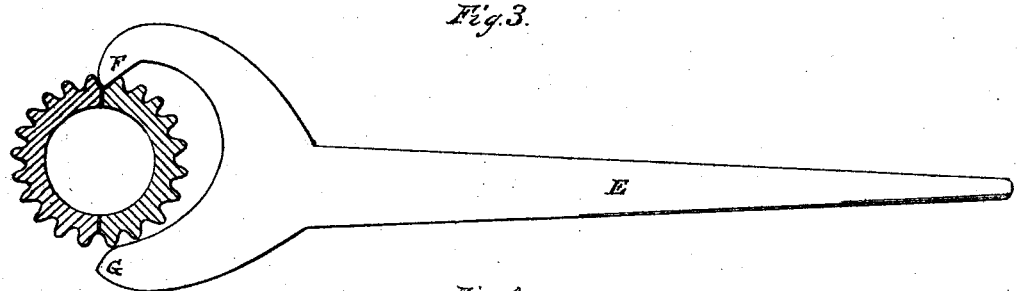
Figure 4:

Figure 1 is a perspective view of the cylinder of my cutter; Fig. 2 is an end view of the same; Fig. 3 is the hooked lever for rotating the cylinder, shown in its position when operating; and Fig. 4 is a side view of one of the cutters.

My invention consists in the construction of a tool, hereinafter particularly described, for the cutting off of gas-pipe in places where the ordinary cutters cannot be conveniently applied.

The body of the tool consists of a cylinder formed in two halves, A B, of proper size to receive the pipe to be cut. These halves when brought together at line *a a* are fastened together by the screws *e e*, whose heads are countersunk, as shown in Fig. 1. Through one of the half cylinders B is introduced, at a proper angle, the adjustable cutter, Fig. 4, having the notched head D, the threaded shank *b*, and the cutting-point *c*. The form of this cutter is clearly shown in Figs. 1 and 4. On the outside of the cylinder A B ratchet-teeth *d d d* are cut, which receive the hook or toe F of lever E. This lever is also provided with a rounded heel, G, which rides over the teeth *d d d*, when the hook F is pushed forward to get a new hold on said teeth.

I prefer to have two cutters in each cylinder, as shown in Fig. 1. A cutter of another form, having a slot for the reception of an adjusting set-screw, is shown attached to the end of the cylinder in Fig. 2. The form shown in Fig. 4 is that which I prefer, as it is always in proper position for its work in every position of the screw *b*.

The operation is as follows: The cylinder, in two halves, is placed around the pipe which it is desired to cut. The halves A B are then fastened together by the screws *e e*, or other suitable means. The cutter is brought to the line at which the pipe is to be severed, and the lever E is then applied and worked back and forth, rotating the cylinder by means of the ratchet-teeth *d d d* around the gas-pipe, the cutter being gradually screwed in as the cutting progresses until the pipe is severed. The lever E will operate the cylinder in either direction, as may be desired, by merely reversing its position relatively to the ratchet-teeth.

The cutter consists of the sharpened end of the screw, to which a conical or pyramidal shape is given, as shown in Fig. 4. Its shape is such that in every position of the screw the cutting-point is properly presented to its work.

I contemplate using two cutters in each cylinder or cutter-stock, placed in opposite ends and at reverse angles, so that cutting may be performed in whichever direction the cylinder may be rotated. I also contemplate the use of the lever E, constructed as described, with ratched cylinders for other purposes than the cutting of gas-pipe.

Claims.

Having thus fully described my invention, what I claim, and desire to secure by Letters Patent, is—

1. The cylindrical cutter-stock A B, formed in two parts and provided with ratchet-teeth on its exterior surface, in the manner and for the purpose set forth.

2. In combination with the cylindrical cutter-stock A B, one or more cutters, arranged substantially as shown, for the purpose specified.

3. The adjustable set-screw cutter, as described and shown in Fig. 4.

4. In combination with a cylindrical cutter-stock, provided with ratchet-teeth, as described, or with a ratched cylinder of any description, the detached ratchet-lever E having the hooked toe F, and the round heel G, and constructed, applied, and operating as stated.

5. The combination and arrangement of the ratched cylinder A B, the cutter D, and the lever E, in the manner and for the purpose set forth.

The above specification of my said invention signed and witnessed at Rockford this 1st day of May, A. D. 1872.

RUFUS S. SANBORN.

Witnesses:
N. C. WARNER,
C. A. SANBORN.